(12) United States Patent
Lhuillier et al.

(10) Patent No.: US 9,457,779 B2
(45) Date of Patent: Oct. 4, 2016

(54) PRIMARY PISTON COMPONENT FOR A MASTER CYLINDER OF A HYDRAULIC BRAKE SYSTEM AND METHOD OF OPERATING A HYDRAULIC BRAKE SYSTEM

(71) Applicant: Robert Bosch GmbH, Stuttgart (DE)

(72) Inventors: Laurent Lhuillier, Le Blanc Mesnil (FR); Bastien Cagnac, Cramoisy (FR); Masaki Shiwa, Paris (FR); Alain Benoit, Sevran (FR)

(73) Assignee: ROBERT BOSCH GMBH, Stuttgart (DE)

( * ) Notice: Subject to any disclaimer, the term of this patent is extended or adjusted under 35 U.S.C. 154(b) by 361 days.

(21) Appl. No.: 14/046,130

(22) Filed: Oct. 4, 2013

(65) Prior Publication Data

US 2014/0096517 A1 Apr. 10, 2014

(30) Foreign Application Priority Data

Oct. 5, 2012 (EP) .................................... 12187488

(51) Int. Cl.
*B60T 13/16* (2006.01)
*B60T 11/16* (2006.01)
*B60T 11/20* (2006.01)
*B60T 11/224* (2006.01)
*B60T 13/74* (2006.01)

(52) U.S. Cl.
CPC .............. *B60T 13/165* (2013.01); *B60T 11/16* (2013.01); *B60T 11/20* (2013.01); *B60T 11/224* (2013.01); *B60T 13/745* (2013.01)

(58) Field of Classification Search
CPC .......................... B60T 11/224; B60T 13/165
See application file for complete search history.

(56) References Cited

U.S. PATENT DOCUMENTS 1,919,465 A * 7/1933 Furgason ........................ 60/576
2,311,787 A * 2/1943 Swift ............................. 60/578

FOREIGN PATENT DOCUMENTS

EP 2 465 742 6/2012
WO WO 2011/085836 7/2011

* cited by examiner

*Primary Examiner* — F. Daniel Lopez
(74) *Attorney, Agent, or Firm* — Norton Rose Fulbright US LLP

(57) ABSTRACT

A primary piston component for a master cylinder of a hydraulic brake system includes a primary piston housing and an additional piston component, which is configured to be at least partially movable into a cavity of the primary piston housing. An inner piston body extends through the cavity along a central line of the primary piston component. A braking force applied on a brake actuating element is transferable at least partially on the inner piston body, and further on the primary piston housing. The additional piston component is at least partially movable into the cavity between the inner piston body and the primary piston housing, and a brake booster force is transferable at least partially on the additional piston component, and via the inner piston body on the primary piston housing. A method of operating a hydraulic brake system is also described.

7 Claims, 11 Drawing Sheets

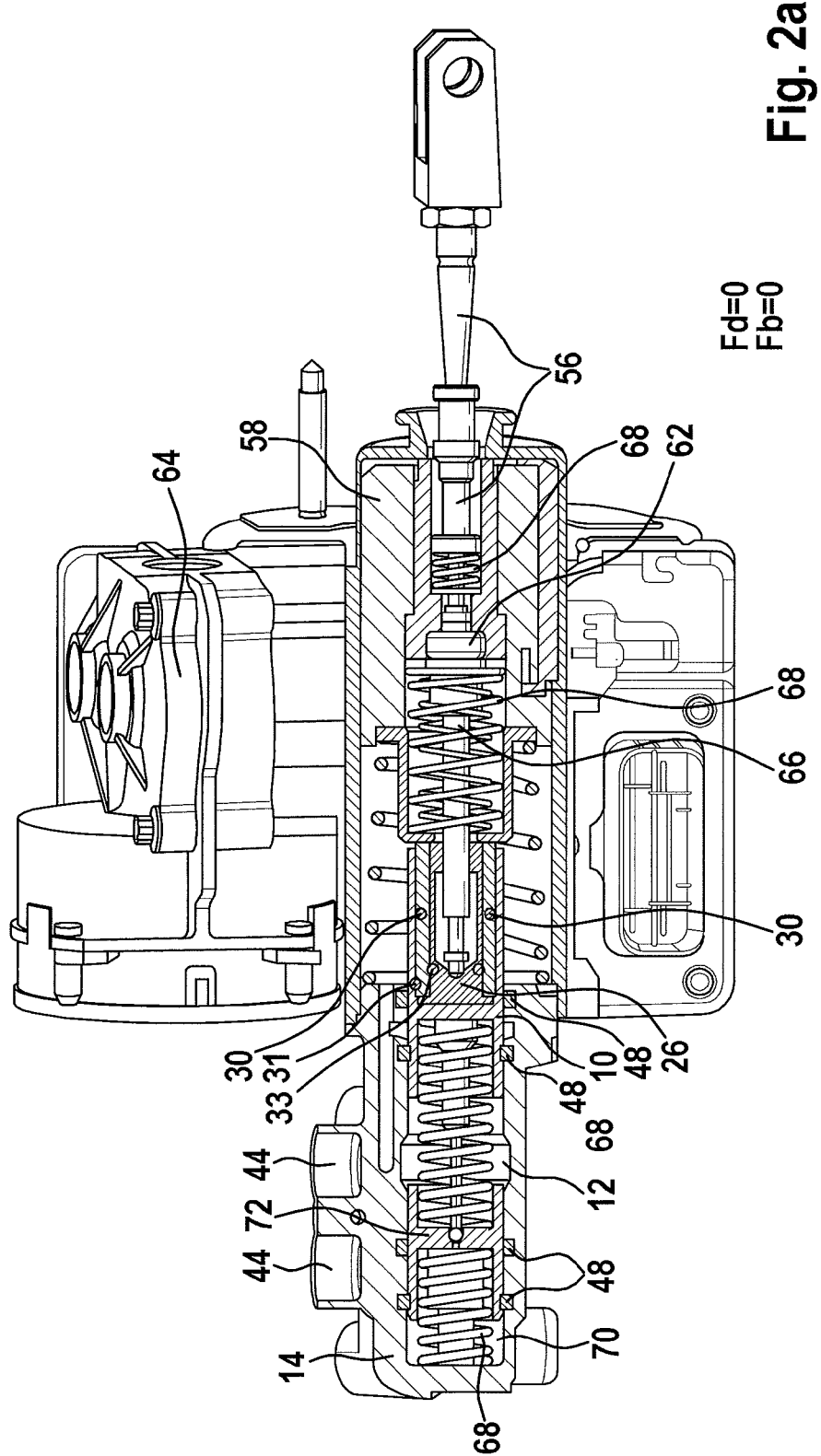

In a primary piston component of a master cylinder, move a primary piston housing at least partially into a pressure chamber of a master cylinder by a braking force applied to a brake actuating element, where the braking force is transferred to an inner piston body of the primary piston component via at least one first braking force transfer element.

While the primary piston housing is moved by the braking force, apply a brake booster force to (i) the at least one first braking force transfer element and/or (ii) at least one second braking force transfer element, thereby causing (i) and/or (ii) to contact an additional piston component, moving the additional piston component at least partially into a cavity between the inner piston body and the primary piston housing to transfer the brake booster force at least partially via the additional piston component to the inner piston body, and further to the primary piston housing.

PRIMARY PISTON COMPONENT FOR A MASTER CYLINDER OF A HYDRAULIC BRAKE SYSTEM AND METHOD OF OPERATING A HYDRAULIC BRAKE SYSTEM

CROSS REFERENCE TO RELATED APPLICATION

The present application claims priority to European Application No. EP 121 87 488.7, filed on Oct. 5, 2012, which is expressly incorporated herein in its entirety by reference thereto.

FIELD OF INVENTION

The present invention relates to a primary piston component for a master cylinder of a hydraulic brake system. The present invention further relates to a master cylinder for a hydraulic brake system and a hydraulic brake system for a vehicle. Moreover, the present invention relates to a method of operating a hydraulic brake system.

BACKGROUND OF THE INVENTION

International Patent Publication No. WO 2011/085836 describes a main brake cylinder for a hydraulic vehicle brake system and a method for operating the same. The main brake cylinder comprises a primary piston component with an outer piston, which is configured to be at least partially movable into a pressure chamber of the master cylinder. The outer piston has a cavity formed at a backside of the outer piston. The primary piston component further comprises an inner piston, which is movable at least partially within the cavity formed at the backside of the outer piston.

SUMMARY

The present invention provides a primary piston component for a master cylinder of a hydraulic brake system, a master cylinder for a hydraulic brake system, a hydraulic brake system for a vehicle and a method of operating a hydraulic brake system.

The present invention provides a primary piston component for a master cylinder, wherein a brake booster force provided by a brake booster is transferable via an additional piston component on the inner piston body, which contacts a primary piston housing such that the primary piston component is moved at least partially into the pressure chamber of the master cylinder by the brake booster force. Moreover, a driver's braking force applied on a brake actuating element, for instance on a brake pedal, is transferred via the inner piston body on the primary piston housing. Thus, both forces can be used to transfer the primary piston component into the pressure chamber of the master cylinder. The primary piston component therefore provides a very comfortable normal mode for the driver. Moreover, in case of a failure of the brake booster, the primary piston component is operable in a backup mode, wherein only the inner piston body and the primary piston housing have to be transferred to increase an internal pressure within the pressure chamber of the master cylinder. Thus, it is possible to transfer the primary piston housing with the lower force after a failure of the brake booster. The present invention therefore also provides a better comfort for a driver who increases the internal pressure within the pressure chamber of the master cylinder without the performance of the brake booster.

The present invention provides a primary piston component which has no complex structure. It is therefore inexpensive to produce. Moreover, the package size of the inventive primary piston component is significantly small. This facilitates the arrangement of the inventive primary piston component.

For instance, the additional piston component is a hollow cylindrical piston, wherein the inner piston body extends at least partially through a round opening within the hollow cylindrical piston. As will be explained below, such a hollow cylindrical piston is contactable easily by a boost body of the brake booster. It is therefore possible to transfer the brake booster force by using a conventional and cheap boost body.

Preferably, the inner piston body has a cylindrical form with a first diameter at a first end of the inner piston body and a larger second diameter at a second end of the inner piston body, wherein the first diameter of the inner piston body is equal to or smaller than an inner diameter of the round opening within the hollow cylindrical piston. In this case the brake booster force is transferable on the inner piston body via the hollow cylindrical piston contacting a step between the first diameter and the second diameter. This ensures that the brake booster force is transferred on the primary piston housing without a (direct) contact between the primary piston housing and the hollow cylindrical piston.

For instance, the inner piston body is a piston, which is unbound to the primary piston housing. Alternatively, the primary piston housing and the inner piston body are formed with a single part. In both cases the inner piston body is producible at low costs.

In a preferred exemplary embodiment, the primary piston housing comprises an annular subunit, which protrudes at the front of the primary piston housing from an internal wall of the primary piston housing with the inner side of the cavity. As will be explained below, such a primary piston component ensures a fast closing of at least one hydraulic connection (e.g., an orifice hole) between the pressure chamber of the master cylinder and a reservoir.

The advantages listed above are also provided by a corresponding master cylinder.

Moreover, it is possible to realize these advantages with a hydraulic brake system comprising such a master cylinder.

Furthermore, the advantages explained above are also provided by performing a corresponding method of operating a hydraulic brake system.

Exemplary embodiments and advantages of the present invention are described herein with reference to the accompanying drawings.

BRIEF DESCRIPTION OF THE DRAWINGS

FIGS. 2a to 2f show schematic drawings of a second exemplary embodiment of the primary piston component according to the present invention, in which FIGS. 2a, 2c and 2e show side views and FIGS. 2b, 2d and 2f show cross sections.

FIG. 3 shows a flow chart of an exemplary embodiment of the method of operating a hydraulic brake system according to the present invention.

DETAILED DESCRIPTION

FIGS. a to 1c show schematic drawings of a first exemplary embodiment of the primary piston component according to the present invention.

The primary piston component described herein is designed for its use in a master cylinder 14 of a hydraulic brake system. The use of the primary piston component is not restricted to a certain type of master cylinder 14 or to a certain embodiment of the hydraulic brake system. Instead, it is possible to use different types of master cylinders 14 and hydraulic brake systems together with the primary piston component.

Figure 1A:
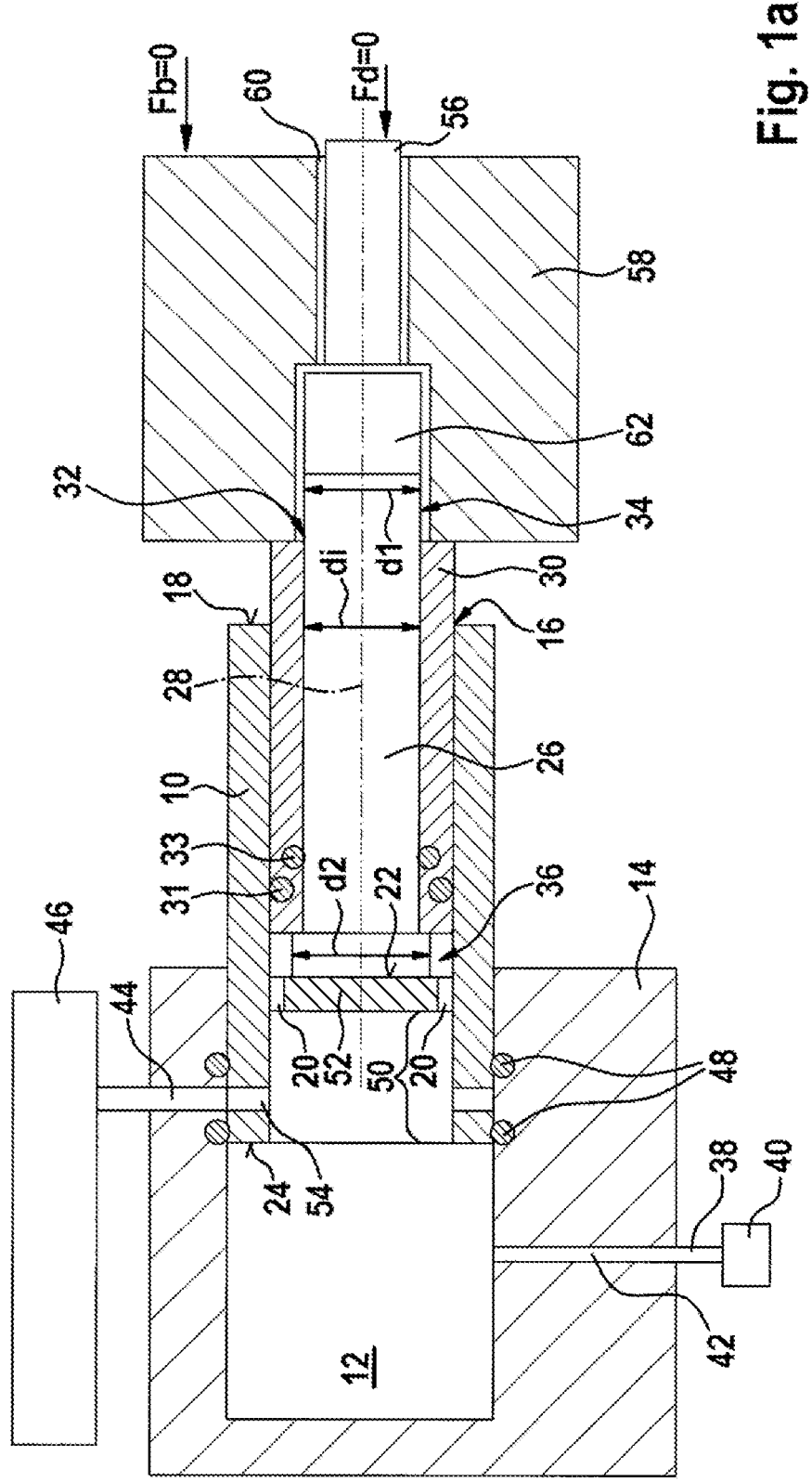
FIGS. 1a to 1c show schematic drawings of a first exemplary embodiment, and FIG. 1d a schematic drawing of a related exemplary embodiment, of the primary piston component according to the present invention.
Figure 1B:
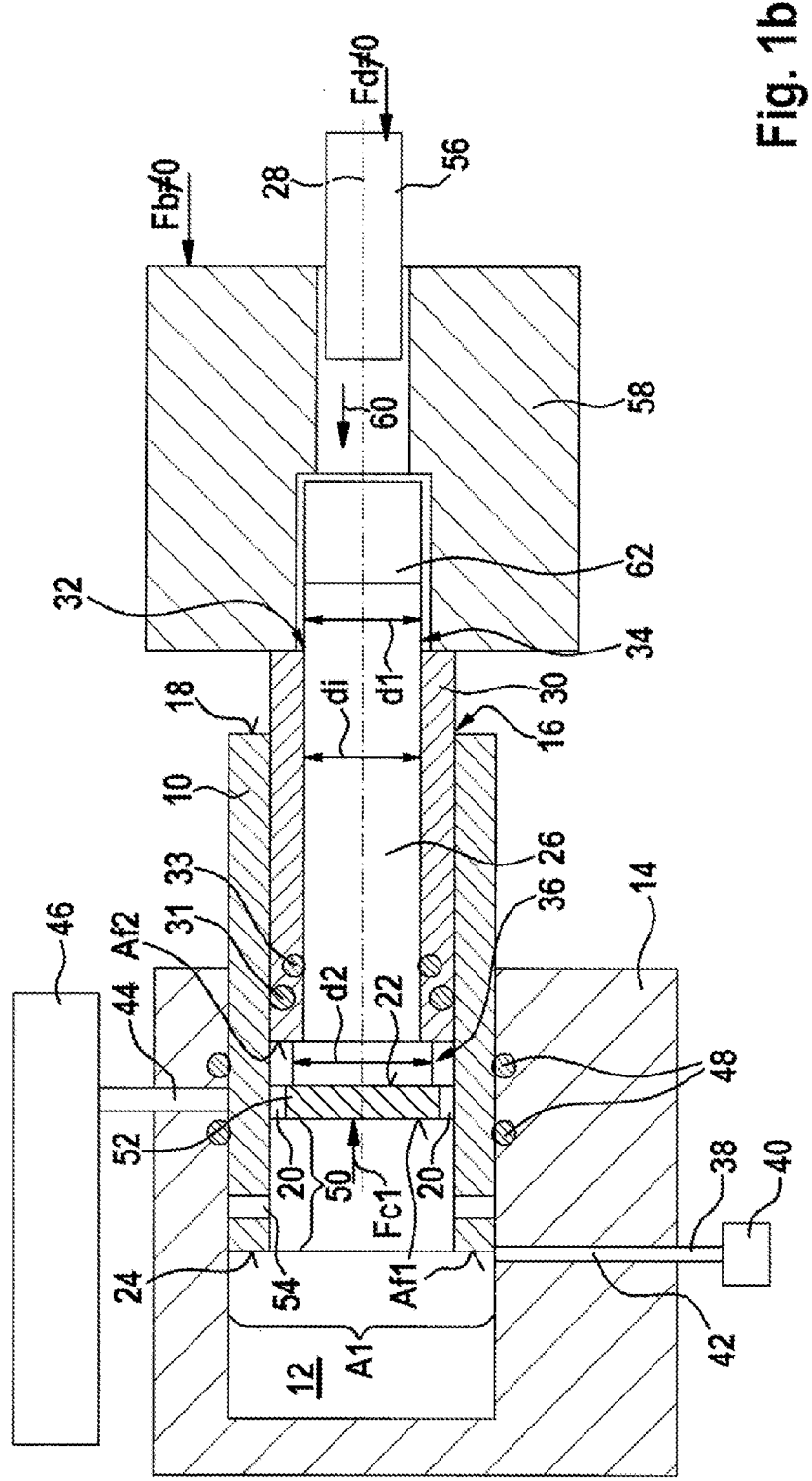
Figure 1C:
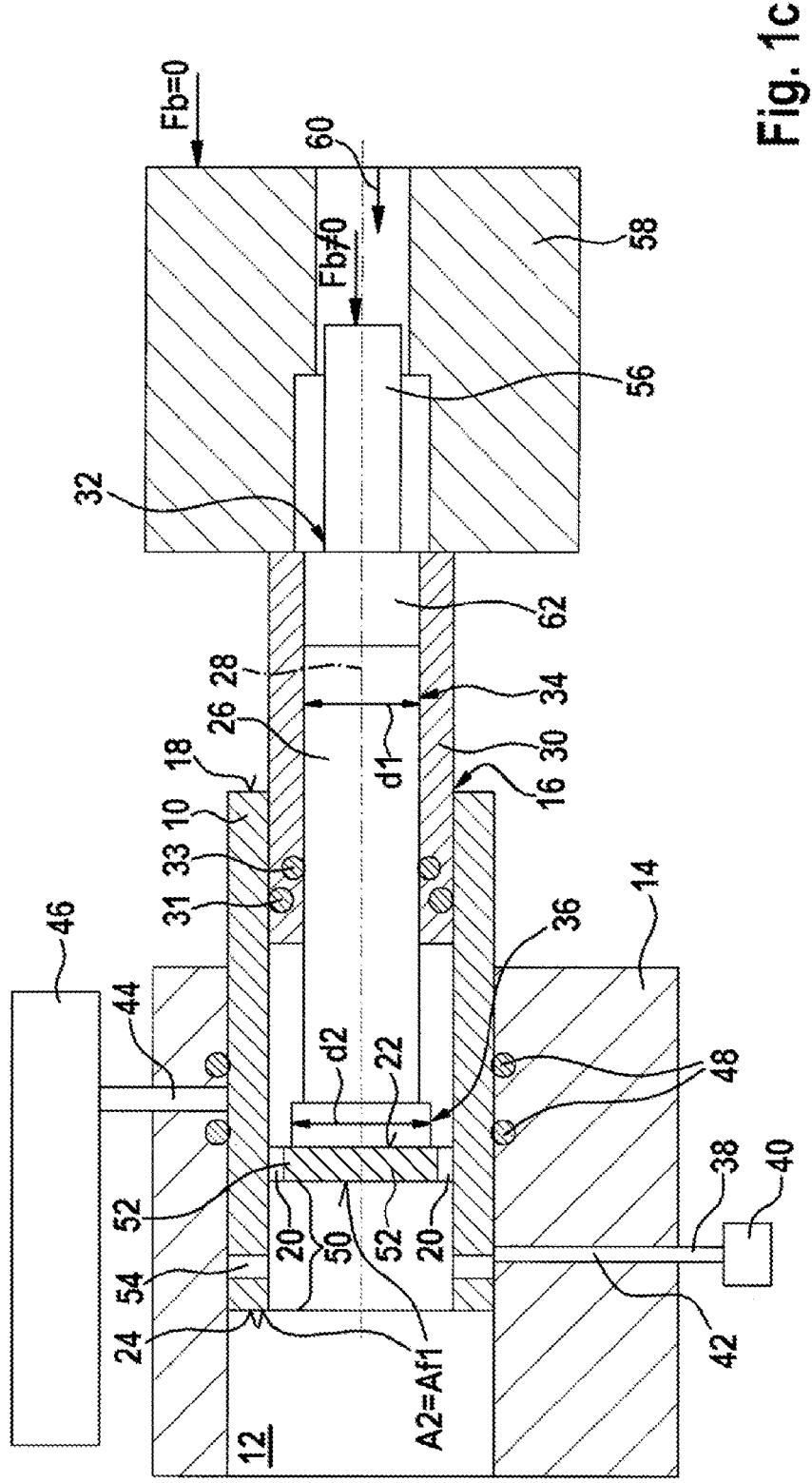

The primary piston component comprises a primary piston housing 10, which is configured to be at least partially movable into a pressure chamber 12 of the master cylinder 14. The master cylinder 14 may be a tandem master cylinder, for instance. In this case the master cylinder 14 also comprises a (not shown) secondary piston component, which is configured to be at least partially movable into another pressure chamber of the master cylinder 14. However, the master cylinder 14 may also be of a type with a single pressure chamber 12, as is shown in FIGS. 1a to 1c.

A cavity 16 is formed at a backside 18 of the primary piston housing 10. The backside 18 of the primary piston housing 10 is a side which is directed away from the internal volume of the pressure chamber 12, when the primary piston housing 10 protrudes partially out of the master cylinder 14. At least one continuous aperture 20 is formed at an inner side 22/bottom of the cavity 16, wherein the inner side 22/bottom is directed to a front 24 of the primary piston housing 10. (The front 24 is directed away from the backside 18 of the primary piston housing 10, so that the front 24 is directed toward the internal volume of the pressure chamber 12, when the primary piston component is moved at least partially into the master cylinder 14.) The at least one continuous aperture 20 is formed such that brake fluid may flow through the at least one continuous aperture 20 out of the pressure chamber 12 into the cavity 16. Thus, the at least one continuous aperture 20 ensures the same pressure within the pressure chamber 12 and the cavity 16.

The primary piston component also comprises an inner piston body 26, which extends through the cavity 16 along a central line 28 of the primary piston component. Thus, the inner piston body 26 runs along the central line 28 of the primary piston component. The inner piston body 26 is designed to be arranged close to at least one first braking force transfer element such that a braking force Fd applied by a driver on a (not shown) brake actuating element is transferrable at least partially via the at least one first braking force transfer element on the inner piston body 26. The brake actuating element may be a brake pedal, for instance. However, the use of the primary piston component is not restricted to a brake actuating element designed as a brake pedal. Examples for the at least one first braking force transfer element are given below.

The inner piston body 26 further contacts the primary piston housing 10 such that the braking force Fd is transferrable at least partially via the inner piston body 26 on the primary piston housing 10. Thus, the primary piston housing 10 is movable at least partially into the pressure chamber 12 by the braking force Fd to increase an internal pressure within the at least one pressure chamber 12 of the master cylinder 14. The driver of the vehicle with the primary piston component therefore has the opportunity to increase the internal pressure within the at least one pressure chamber 12 of the master cylinder 14 by applying the braking force Fd on the brake actuating element. The driver thus has the opportunity to increase the internal pressure within the at least one pressure chamber 12 even in case of a failure of the electrical system of the vehicle.

The primary piston component also comprises an additional piston component 30, which is configured to be at least partially movable into the cavity 16 of the primary piston housing 10. The additional piston component 30 is at least partially movable into a space of the cavity 16, which is between the inner piston body 26 and the primary piston housing 10. The additional piston component 30 is designed to be arranged close to the at least one first braking force transfer element, at least one second braking force transfer element and/or a (not shown) brake booster such that a brake booster force Fb provided by the brake booster is transferable at least partially on the additional piston component 30 to move the additional piston component 30 at least partially into the cavity 16. The additional piston component 30 may further contact the inner piston body 26 such that the brake booster force Fb is also transferable at least partially via the inner piston body 26 on the primary piston housing 10.

It is therefore possible to use the brake booster as a support for the driver during a decrease of the velocity of his vehicle. In this case, the primary piston housing 10 is moved into the pressure chamber 12 by a total force which is higher than the braking force Fd. For instance, the total force may be a sum of the braking force Fd of the driver and the brake booster force Fb. The driver therefore has to apply a lower braking force Fd on the brake actuating element, even though the primary piston housing 10 is moved into the pressure chamber 12 by a significantly higher total force. The exemplary embodiment of FIGS. 1a to 1c thus facilitates an increase of the internal pressure within the pressure chamber 12 for the driver.

Any type of brake booster may be used together with the primary piston component. For instance, the brake booster may comprise an electrical motor to apply the brake booster Force Fb on the at least one first braking force transfer element and/or second braking force transfer element.

In the exemplary embodiment of FIGS. 1a to 1c, the additional piston component 30 is a hollow cylindrical piston 30, wherein the inner piston body 26 extends at least partially through a round opening 32 within the hollow cylindrical piston 30. However, the form of the additional piston component 30 is not restricted to a hollow cylindrical form.

Preferably, the inner piston body 26 has a cylindrical form with a first diameter d1 at a first end 34 of the inner piston body 26 and a larger second diameter d2 at a second end 36 of the inner piston body 26. Especially, the first diameter d1 of the inner piston body 26 is equal to or smaller than an inner diameter di of the round opening 32 within the hollow cylindrical piston 30. This exemplary embodiment of the components 26 and 30 ensures that a front of the hollow cylindrical piston 30 contacts a step between the first diameter d1 and the second diameter d2 without contacting the inner side 22 of the cavity 16 within the primary piston housing 10. The brake booster force Fb applied by the brake booster thus supports the movement of the inner piston body 26. A direct contact between the primary piston housing 10 and the hollow cylindrical piston 30 is thus inhibited. The driver therefore has an enjoyable brake feeling when he applies the braking force Fd on the (not shown) brake actuating element.

Preferably, a sealing ring 31 is arranged between the primary piston housing 10 and the hollow cylindrical piston 30. Another sealing ring 33 may be arranged between the hollow cylindrical piston 30 and the inner piston body 26. Thus, it is possible to inhibit a leakage of brake fluid out of the pressure chamber 12. The at least on sealing ring 31 and 33 may be inserted into a notch within at least one of the components 10, 26 and 30. The at least on sealing ring 31 and 33 may be a lip seal, for instance. However, the primary piston component is not restricted to any particular embodiment of a sealing ring 31 and 33.

Figure 1D:
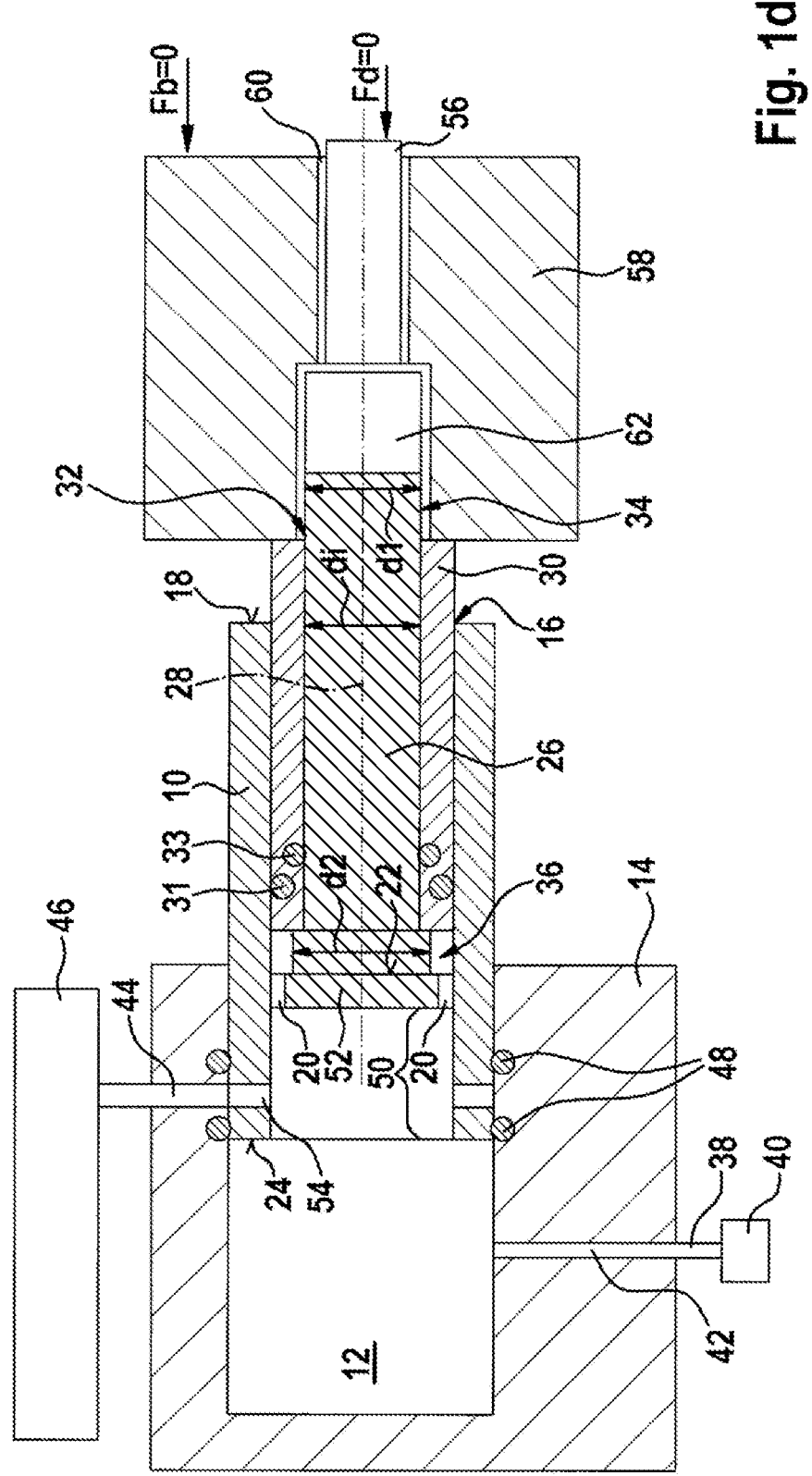

In the exemplary embodiment of FIGS. 1a to c, the inner piston body 26 is a piston, which is movable at least partially into the cavity 16 of the primary piston housing 10. However, it is also possible to form the primary piston housing 10 and the inner piston body 26 as a single part. FIG. 1d shows a schematic drawing of an exemplary embodiment of the primary piston component in which the primary piston housing 10 and the inner piston body 26 are a single part. This facilitates the arrangement of the primary piston component close to/into the master cylinder 14.

At least one brake circuit 38 may be tied/connected to the at least one pressure chamber 12 of the master cylinder 14 such that a brake pressure within at least one wheel brake cylinder 40 of the at least one brake circuit 38 is increasable by an increase of the internal pressure within the at least one pressure chamber 12. The use of the master cylinder 14 with the primary piston component is not restricted to a certain type of the at least one brake circuit 38 or the at least one wheel brake cylinder 40.

The housing of the master cylinder 14 may comprise at least one aperture 42 which links the at least one brake circuit 38 to the at least one pressure chamber 12. The housing of the master cylinder 14 may also have at least one orifice hole 44, which extends from an inner wall of the at least one pressure chamber 12 to a hydraulic line of a reservoir 46. Also, the master cylinder 14 may comprise at least two sealing rings 48 (e.g., lip seals), which are arranged for instance in two notches surrounding the at least one orifice hole 44, and which contact the outside of the primary piston housing 10. In this case the contact between sealing rings 48, the primary piston housing 10 and the master cylinder 14 inhibits the leakage of brake fluid out of the at least one pressure chamber 12.

Preferably, the primary piston housing 10 comprises an annular subunit 50, which protrudes at the front 24 of the primary piston housing 10 from an internal wall 52 of the primary piston housing 10 with the inner side 22 of the cavity 16. The annular subunit 50 ensures a fast closing of the at least one orifice hole 44 at a position of the primary piston housing 10, when a large part of the primary piston housing 10 still protrudes out of the master cylinder 14. Preferably, an extension 54 of the at least one orifice hole 44 is formed through the annular subunit 50.

In the exemplary embodiment of FIGS. 1a to 1c, the hydraulic brake system comprises at least one input rod 56/push rod as the at least one first braking force transfer element. At least a boost body 58, which is movable by the (not shown) brake booster, is the at least one second braking force transfer element. The boost body 58 has an opening 60 with a first diameter at a side of the boost body 58 directed away from the master cylinder 14. A larger second diameter of the opening 60 is formed at a second side of the boost body 58, which is directed toward the master cylinder 14. A reaction disc 62 is arranged within the opening 60 of the boost body 58 at the step between the first diameter and the second diameter. The reaction disc 62 may be contacted by the input rod 56 at one side and by the first end 34 of the inner piston body 26 on another side. Thus, the braking force Fd is transferrable at least partially from the input rod 56 via the reaction disc 62 on the inner piston body 26. At least a part of the brake booster force Fb may also be transferred on the inner piston body 26 via the reaction disc 62. In an advantageous exemplary embodiment, the reaction disc has a diameter equal to the inner diameter di of the round opening 32 within the hollow cylindrical piston 30. Preferably, most of the brake booster force Fb is transferred on the additional piston component 30 via a (direct) contact between the additional piston component 30 and boost body 58.

The arrangement of the additional piston component 30 around the inner piston body 26 makes it easier to contact the additional piston component 30 by a boost body 58. Thus, a conventional and inexpensive boost body 58 may be used.

FIG. 1a shows the primary piston component in a situation, when the driver does not apply any force on the (not shown) brake actuating element. The braking force Fd is therefore zero. The brake booster is also inactivated and the brake booster force Fb is zero.

In an exemplary embodiment, a (not shown) gap may be provided between the input rod 56 and the reaction disc 62, when the driver does not operate the brake actuating element. Thus, it is possible to use a generator for decreasing the velocity of the car before a brake pressure is build up in the at least one pressure chamber 12.

FIG. 1b shows the primary piston component in a braking situation, when the brake system is in a normal mode. The brake system is operable in the normal mode in case that the brake booster is operable and thus supports the driver.

The driver applies a braking force Fd unequal zero on the (not shown) brake actuating element. The brake booster supports the driver by applying the brake booster force Fb via the additional piston component 30 on the primary piston housing 10. For instance, the brake booster force Fb may be a function of the braking force Fd. Thus, the total force applied on the primary piston housing 10 may be significantly higher than the braking force Fd. Thus, it is possible to move the primary piston housing 10 faster than the input rod 56 to increase the internal pressure within the at least one pressure chamber 12 quickly (see FIG. 1b).

In the normal mode the different parts of the primary piston component are movable such that an inner volume of the adjacent pressure chamber 12 is decreased at a first area A1. The first area A1 may be a sum of a first front area Af1 of the primary piston housing 10 directed into the adjacent pressure chamber 12 and a second front area Af2 of the additional piston component 30 contacting brake fluids. A compressing force Fc1 acting against the movement of the different parts of the primary piston component is therefore:

$$Fc1 = p*A1,$$

wherein p is the pressure within the at least one pressure chamber 12.

FIG. 1c shows the primary piston component in a braking situation, when the hydraulic brake system is in a backup mode. The backup mode is defined as the mode of the hydraulic brake system during a failure or a functional impairment of at least the brake booster. For instance, the hydraulic brake system may be run in the backup mode after a breakdown of the electrical system of its vehicle.

In the backup mode the brake booster force Fb is equal to zero. The additional piston component 30 therefore stays in its outer position, even though the driver pushes the inner piston body 26 and the primary piston housing 10 into the adjacent pressure chamber 12. Thus, the mass moved by the driving force Fd is decreased.

Furthermore, due to the at least one continuous aperture 20 within the internal wall 52 of the primary piston housing 10, the inner volume of the adjacent pressure chamber 12 is decreased at a second area A2, which is smaller than the first area A1. For instance, the second area A2 may be equal to the first front area Af1 of the primary piston housing 10 directed into the adjacent pressure chamber 12. The compressing force Fc2 acting against the movement of the different parts of the primary piston component is therefore:

$$Fc2 = p*A2 < Fc1$$

Thus, the driver has the opportunity to move the primary piston housing 10 into the adjacent pressure chamber 12 by a braking force Fd smaller than the compressing force Fc1.

Figure 2B:
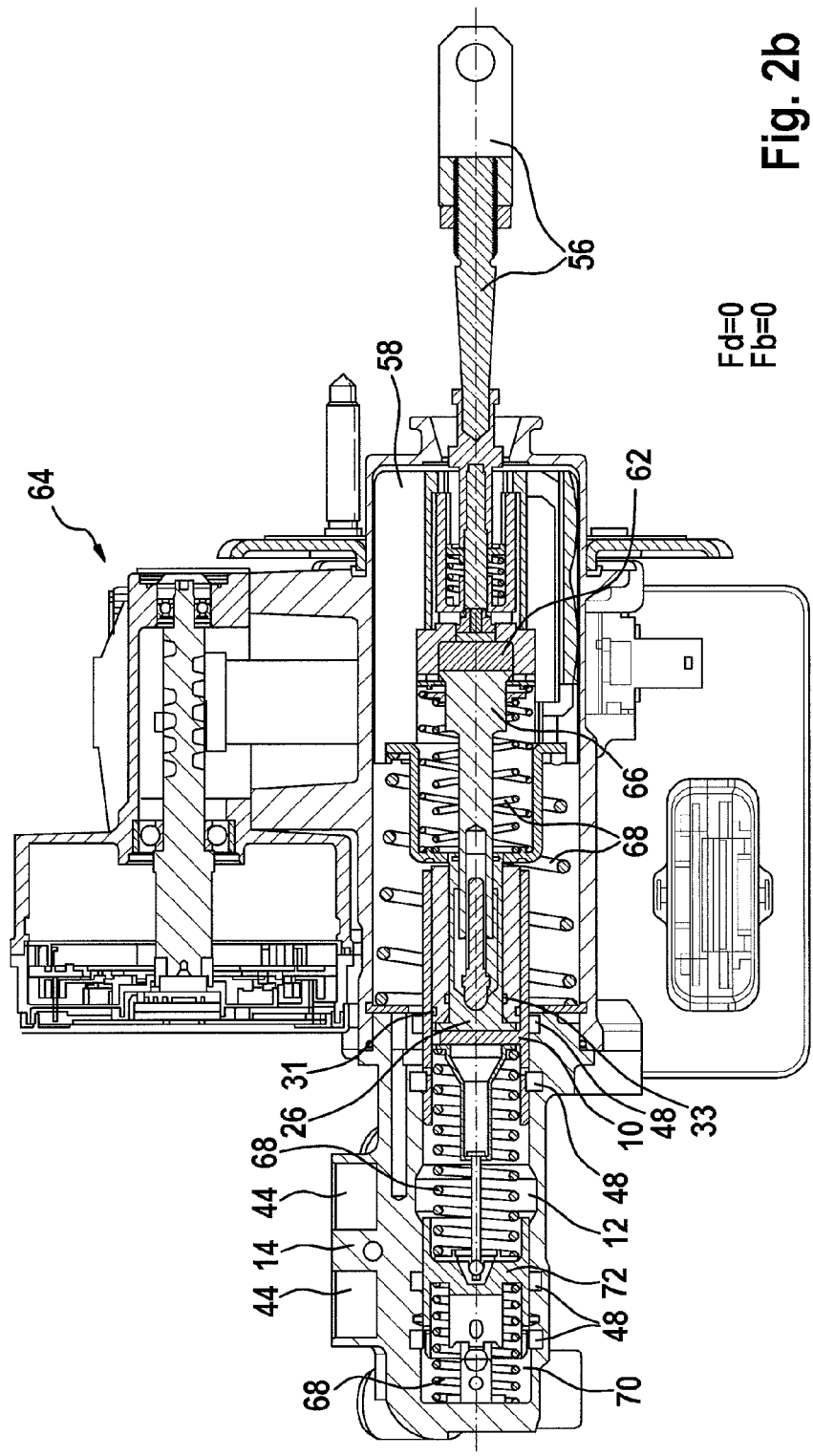
Figure 2C:
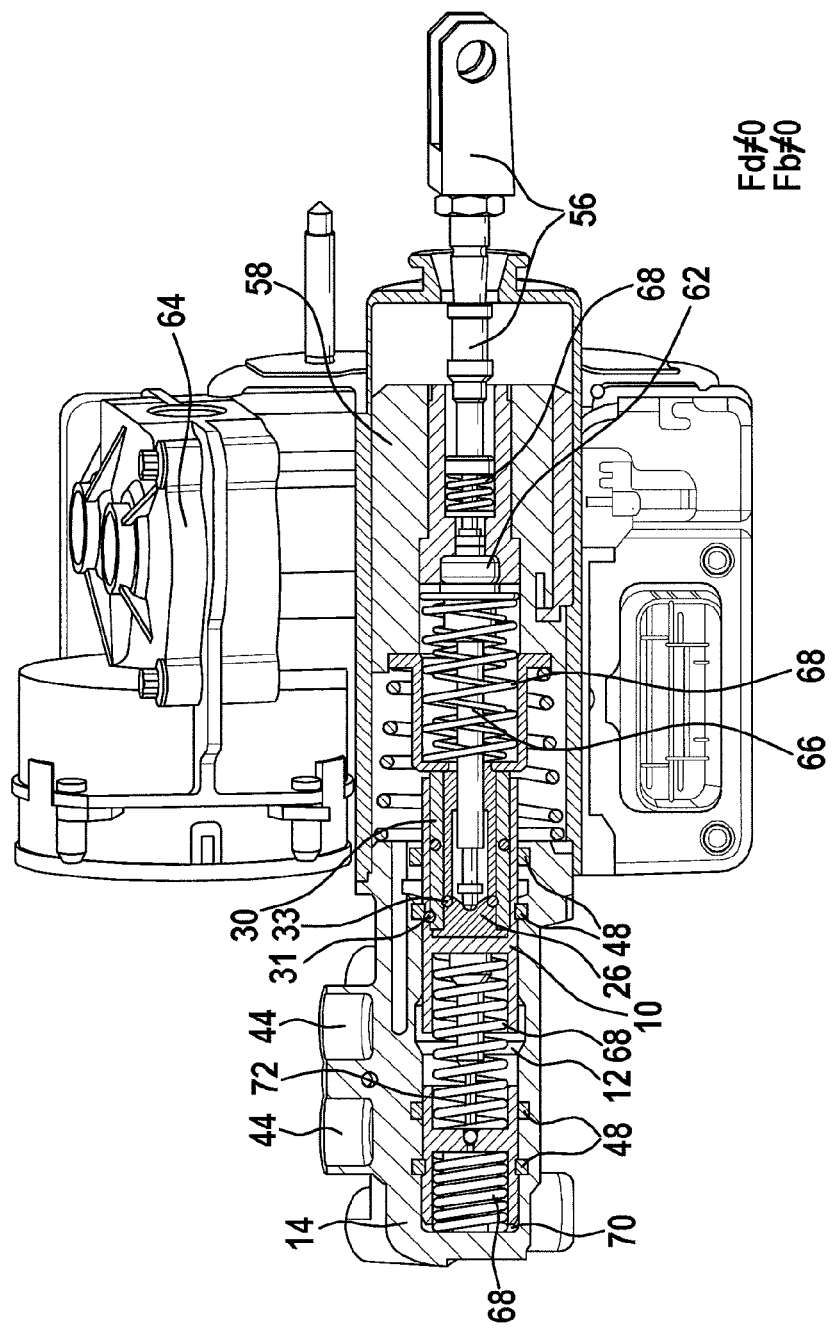
Figure 2D:
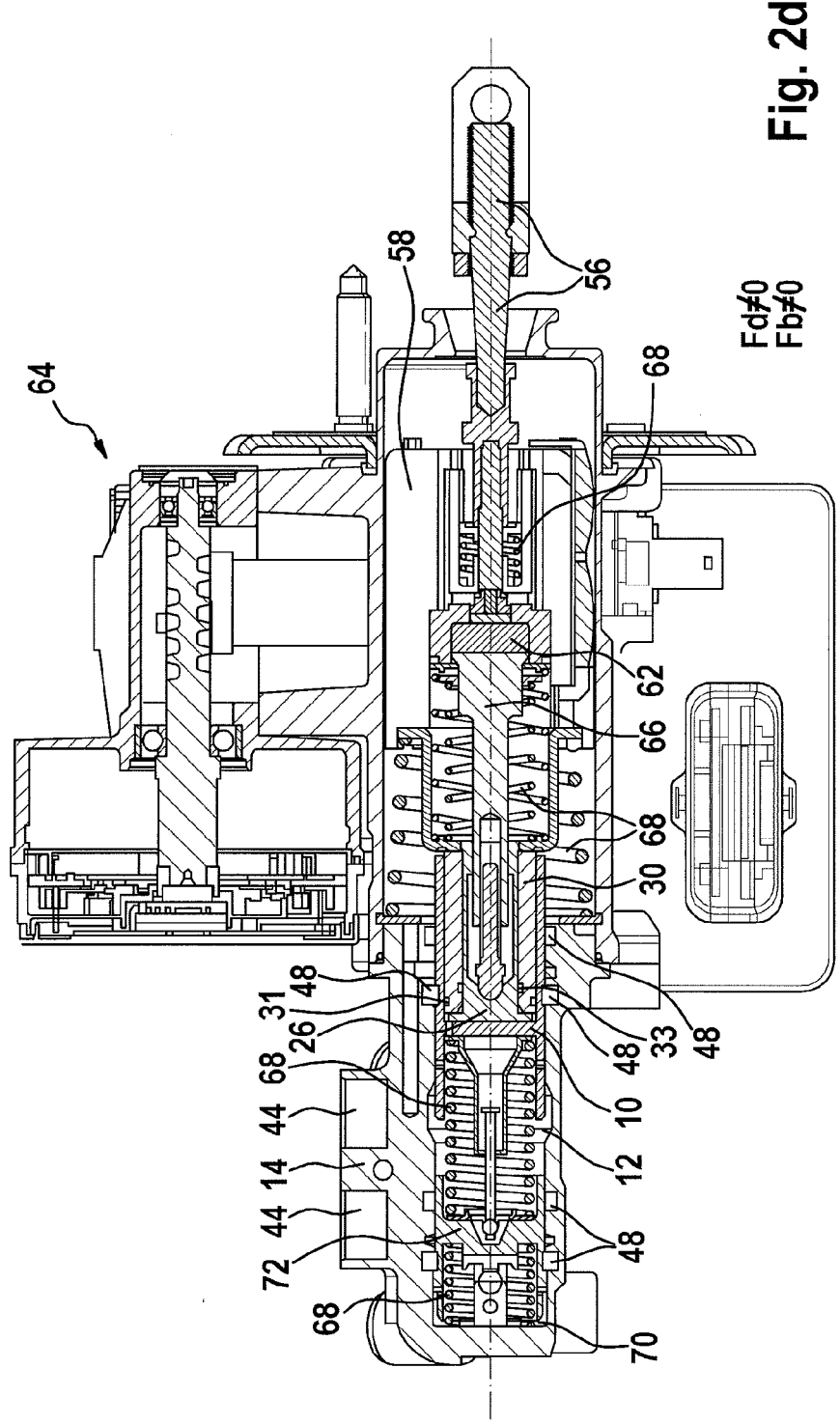
Figure 2E:
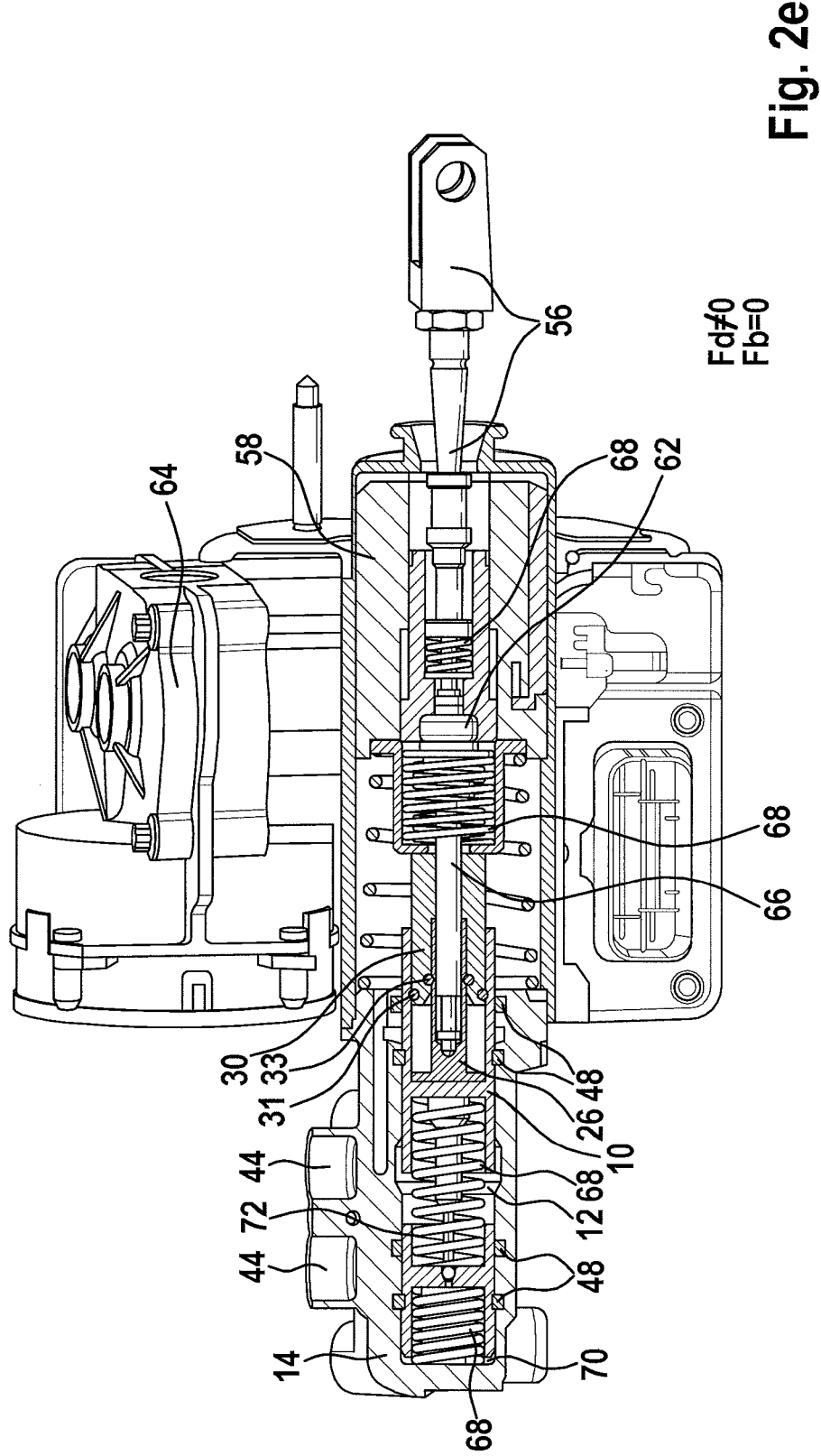
Figure 2F:
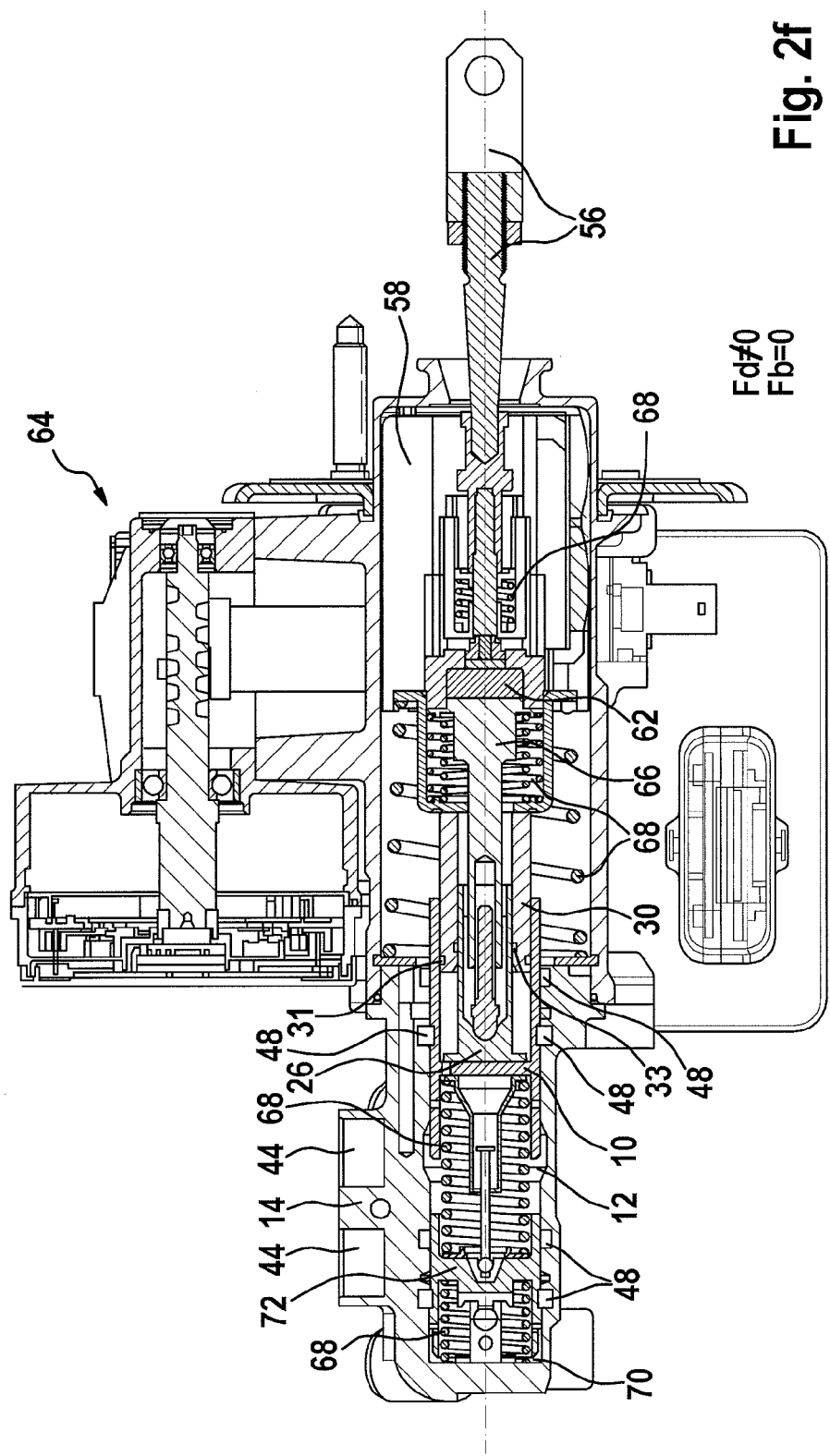

FIGS. 2a to 2f show schematic drawings of a second exemplary embodiment of the primary piston component according to the present invention, in which FIGS. 2a, 2c and 2e show side views and FIGS. 2b, 2d and 2f show cross sections.

The primary piston component shown in FIGS. 2a to 2f has all the features described above. The primary piston component is designed to interact with a brake booster with a motor 64, which is shown in FIGS. 2a to 2f. FIGS. 2a to 2f also show an output rod 66 arranged between the reaction disc 62 and the inner piston body 26 and the return springs 68 (not shown in the figures above).

The primary piston of FIGS. 2a to 2f is arranged in a tandem master cylinder 14 with an additional pressure chamber 70, whose volume is reducible by moving a secondary piston 72 at least partially into the additional pressure chamber 70.

FIGS. 2a and 2b show the primary piston component in a situation with a braking force Fd equal to zero. The working mechanism of the primary piston component in a braking situation of the normal mode is shown in FIGS. 2c and 2d. Furthermore, the working mechanism of the primary piston component in a braking situation of the backup mode is shown in FIGS. 2e and 2f.

The primary piston components described above have a high robustness. They are producible by using conventional equipment. The package length of the primary piston components along the central line 28 is significantly short. This facilitates the arrangement of any primary piston component within a master cylinder.

The advantages described above are also ensured by a master cylinder for a hydraulic brake system comprising such a primary piston component and a hydraulic brake system for a vehicle comprising a corresponding master cylinder.

FIG. 3 shows a flow chart of an exemplary embodiment of the method of operating a hydraulic brake system according to the present invention.

The method described below may be carried out with a master cylinder of a hydraulic brake system, which comprises a primary piston component with a primary piston housing, an inner piston body, which extends through a cavity at a back side of the primary piston housing along a central line of the primary piston component, and an additional piston component. For instance, the method may be carried out with one of the exemplary embodiments described above. However, the performance of the method is not restricted to such a master cylinder or to such a primary piston component.

The method comprises a step S1, which is performed while the primary piston housing is moved at least partially into a pressure chamber of the master cylinder by a braking force. The braking force is applied by a driver on a brake actuating element and is transferred on the inner piston body via at least one first braking force transfer element, which contacts the inner piston body. The braking force is then transferred at least partially via the inner piston body on the primary piston housing. The primary piston housing is therefore moved at least partially into an adjacent pressure chamber by at least the braking force.

In the step S1, a brake booster force is applied on the at least one first braking force transfer element and/or at least one second braking force transfer element (by a brake booster). The at least one first and/or second braking force transfer element contacts the additional piston component, wherein the additional piston component is moved at least partially into the cavity between the inner piston body and the primary piston housing by the brake booster force. The additional piston component contacts the inner piston body such that the brake booster force is transferred at least partially via the additional piston component on the inner piston body, and further on the primary piston housing. Thus, the primary piston housing is also moved by at least a part of the brake booster force.

The advantages mentioned above are also provided by the method described herein.

What is claimed is:

1. A primary piston component for a master cylinder of a hydraulic brake system, comprising:
   a primary piston housing adapted to be at least partially movable into a pressure chamber of the master cylinder, a cavity being formed at a back side of the primary piston housing, and at least one continuous aperture being formed at an inner side of the cavity directed toward a front of the primary piston housing;
   an additional piston component; and
   an inner piston body extending through the cavity along a central line of the primary piston component, the inner piston body being adapted to be arranged close to at least one first braking force transfer element such that a braking force applied to a brake actuating element is transferable at least partially via the at least one first braking force transfer element to the inner piston body, and the inner piston body contacting the primary piston housing such that the braking force is transferable at least partially to the primary piston housing,
   wherein the additional piston component is at least partially movable into the cavity between the inner piston body and the primary piston housing, wherein the additional piston component is adapted to be arranged close to at least one of (i) a brake booster and (ii) at least one element acted upon by the brake booster, such that a brake booster force provided by the brake booster is transferable at least partially to the additional piston component, which contacts the inner piston body such that the brake booster force is transferable at least partially via the inner piston body to the primary piston housing, and wherein the at least one element acted upon by the brake booster includes at least one of (i) the at least one first braking force transfer element and (ii) at least one second braking force transfer element.

2. The primary piston component according to claim 1, wherein the additional piston component is a hollow cylindrical piston, and wherein the inner piston body extends at least partially through a round opening within the hollow cylindrical piston.

3. The primary piston component according to claim 2, wherein the inner piston body has a cylindrical form with a first diameter at a first end of the inner piston body and a larger second diameter at a second end of the inner piston body, and wherein the first diameter of the inner piston body is equal to or smaller than an inner diameter of the round opening within the hollow cylindrical piston.

4. The primary piston component according to claim 1, wherein the inner piston body is a piston, which is unbound to the primary piston housing.

5. The primary piston component according to claim 1, wherein the primary piston housing and the inner piston body are formed as a single part.

6. The primary piston component according to claim 1, wherein the primary piston housing comprises an annular subunit, which is located at the front of the primary piston housing, and which protrudes from an internal wall of the primary piston housing, and wherein the inner side of the cavity also protrudes from the internal wall.

7. A method of operating a hydraulic brake system with a master cylinder comprising a primary piston component with a primary piston housing, an inner piston body extending through a cavity at a back side of the primary piston housing along a central line of the primary piston component, and an additional piston component, the method comprising:

while the primary piston housing is moved at least partially into a pressure chamber of the master cylinder by a braking force, which is applied to a brake actuating element and is transferred to the inner piston body via at least one first braking force transfer element, which contacts the inner piston body, and is transferred at least partially via the inner piston body to the primary piston housing, applying a brake booster force to the at least one first braking force transfer element and/or at least one second braking force transfer element, thereby causing the at least one first braking force transfer element and/or the at least one second braking force transfer element to contact the additional piston component, wherein the additional piston component is moved at least partially into the cavity between the inner piston body and the primary piston housing by the brake booster force and contacts the inner piston body such that the brake booster force is transferred at least partially via the additional piston component to the inner piston body, and further to the primary piston housing, and the primary piston housing is also moved by at least a part of the brake booster force.

* * * * *